(12) United States Patent
Pedersen et al.

(10) Patent No.: US 11,606,828 B2
(45) Date of Patent: Mar. 14, 2023

(54) METHODS AND APPARATUSES TO ESTIMATE AND EXCHANGE LATENCY AND/OR RELIABILITY INFORMATION FOR DUAL OR MULTI CONNECTIVITY OPERATION

(71) Applicant: NOKIA TECHNOLOGIES OY, Espoo (FI)

(72) Inventors: Klaus Pedersen, Aalborg (DK); Daniela Laselva, Klarup (DK); Nurul Mahmood, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 89 days.

(21) Appl. No.: 16/977,765

(22) PCT Filed: Mar. 5, 2018

(86) PCT No.: PCT/EP2018/055243
§ 371 (c)(1),
(2) Date: Sep. 2, 2020

(87) PCT Pub. No.: WO2019/170209
PCT Pub. Date: Sep. 12, 2019

(65) Prior Publication Data
US 2020/0404724 A1    Dec. 24, 2020

(51) Int. Cl.
*H04W 76/15*    (2018.01)
*H04W 36/00*    (2009.01)
(Continued)

(52) U.S. Cl.
CPC ......... *H04W 76/15* (2018.02); *H04B 7/0626* (2013.01); *H04B 7/0632* (2013.01); *H04W 36/0069* (2018.08); *H04W 36/30* (2013.01)

(58) Field of Classification Search
CPC . H04W 76/15; H04W 88/06; H04W 36/0069; H04W 40/248; H04W 28/06;
(Continued)

(56) References Cited

U.S. PATENT DOCUMENTS

| 8,155,023 B2 | 4/2012 | Vedantham et al. |
| 10,624,034 B2 * | 4/2020 | Rajagopal ........... H04W 52/146 |

(Continued)

FOREIGN PATENT DOCUMENTS

| GB | 2570134 A | 7/2019 |
| WO | WO 2017/004830 A1 | 1/2017 |

(Continued)

OTHER PUBLICATIONS

"5G-NR (new Radio) in 3GPP From RAN2 Point of View", Industrial Technology Research Institute, 2016, 65 pages.
(Continued)

*Primary Examiner* — Allahyar Kasraian
(74) *Attorney, Agent, or Firm* — Squire Patton Boggs (US) LLP

(57) ABSTRACT

Methods, apparatuses, and computer program products for estimating the reliability and/or latency of a transmission in communication systems are provided. One method may include identifying at least one user equipment requiring dual connectivity or multi connectivity support. The method may then include configuring, by an anchor network node, at least one secondary network node to serve as a duplication set for the at least one user equipment. The duplication set may include one or more secondary network nodes that are capable of transmission of a duplicated packet to at least one user equipment. The method may also include receiving, from the at least one secondary network node, estimates of supported latency and reliability for the at least one user equipment. The configuring may include selecting the dupli-
(Continued)

cation set that minimizes a probability of outage and minimizes latency of the transmission of the duplicated packet to at least one user equipment.

18 Claims, 8 Drawing Sheets

(51) Int. Cl.
*H04B 7/06* (2006.01)
*H04W 36/30* (2009.01)

(58) Field of Classification Search
CPC ... H04W 36/30; H04B 7/0626; H04B 7/0632; H04L 1/08; H04L 1/189; H04L 47/32; H04L 45/24
See application file for complete search history.

(56) References Cited

U.S. PATENT DOCUMENTS

| | | | |
|---|---|---|---|
| 2015/0117313 A1 | 4/2015 | Ranta-Aho et al. | |
| 2016/0057687 A1* | 2/2016 | Horn | H04W 24/10 370/331 |
| 2016/0095004 A1 | 3/2016 | Tseng | |
| 2016/0095034 A1 | 3/2016 | Hampel | |
| 2016/0338039 A1 | 11/2016 | Van der Velde et al. | |
| 2018/0098250 A1* | 4/2018 | Vrzic | H04W 36/0016 |
| 2018/0324663 A1* | 11/2018 | Park | H04W 36/0069 |

FOREIGN PATENT DOCUMENTS

| | | |
|---|---|---|
| WO | WO 2017/182927 A1 | 10/2017 |
| WO | WO 2018/188717 A1 | 10/2018 |

OTHER PUBLICATIONS

J. Lee, et.al., "Coordinated Multipoint Transmission and Reception in LTE-Advanced Systems", IEEE Communications Magazine, Nov. 2012, pp. 44-50.
International Search Report and Written Opinion dated Nov. 7, 2018 corresponding to International Patent Application No. PCT/EP2018/055243.
Roberto P. Antonioli et al., "Dual Connectivity for LTE-NR Cellular Networks," XXXV Simposio Brasileiro de Telecomunicacoes e Processamento de Sinais—SBrT2017, Sep. 3-6, 2017.
3GPP TS 36.321 V15.0.0 (Dec. 2017), Technical Specification, 3rd Generation Partnership Project; Technical Specification Group Radio Access Network; Evolved Universal Terrestrial Radio Access (E-UTRA); Medium Access Control (MAC) protocol specification (Release 15), Dec. 2017.
3GPP TS 38.323 V15.0.0 (Dec. 2017), Technical Specification, 3rd Generation Partnership Project; Technical Specification Group Radio Access Network; NR; Packet Data Convergence Protocol (PDCP) specification (Release 15), Dec. 2017.
First Examination Report issued in corresponding Indian Patent Application No. 202047042013 dated May 28, 2021.
Communication pursuant to Article 94(3) EPC issued in corresponding European Patent Application No. 18 709 330.7 dated Mar. 11, 2022.

* cited by examiner

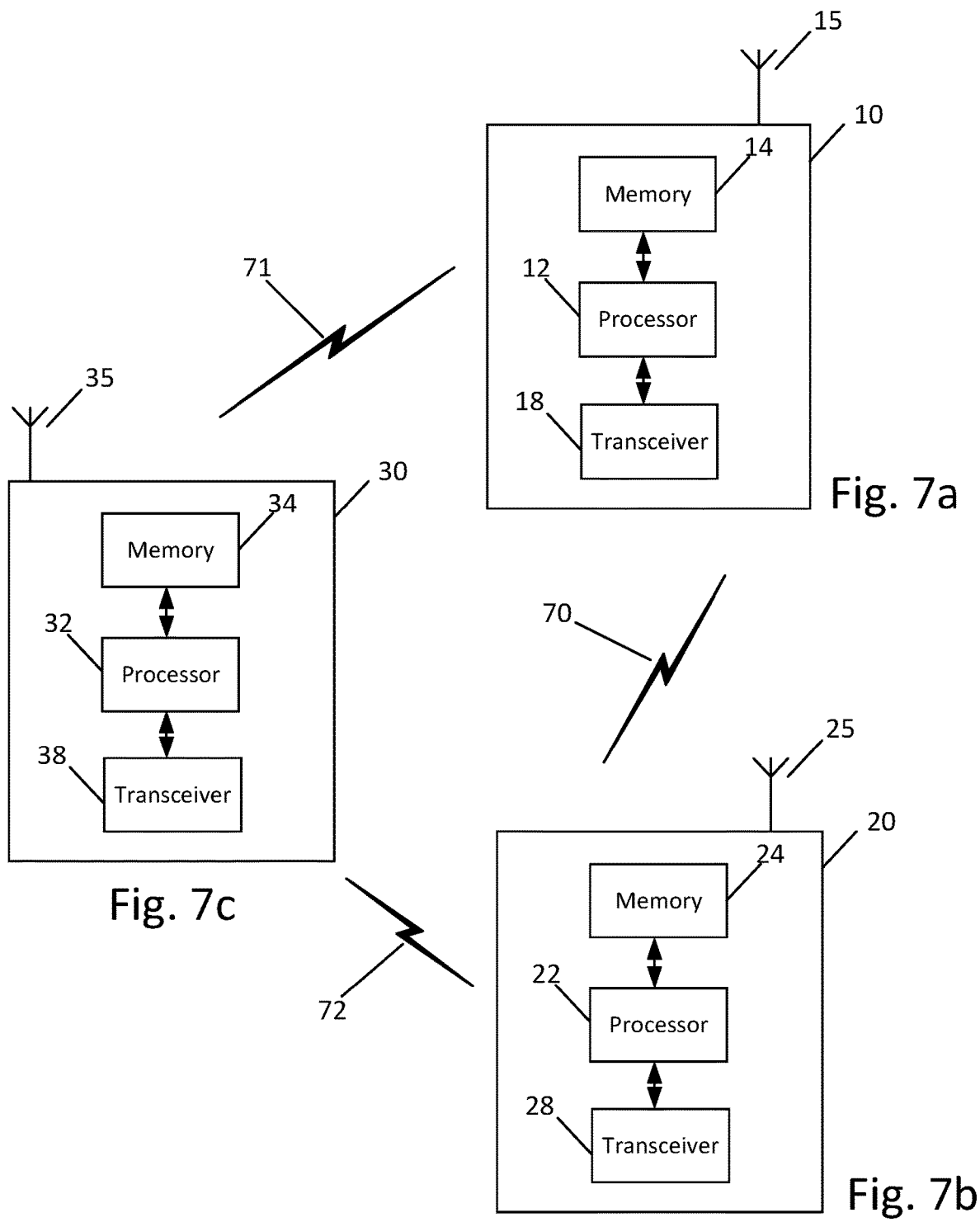

US 11,606,828 B2

METHODS AND APPARATUSES TO ESTIMATE AND EXCHANGE LATENCY AND/OR RELIABILITY INFORMATION FOR DUAL OR MULTI CONNECTIVITY OPERATION

FIELD

Some example embodiments may generally relate to mobile or wireless telecommunication systems. For instance, certain example embodiments may relate to methods for estimating the reliability and/or latency of a transmission in such telecommunication systems, such as Long Term Evolution (LTE) or fifth generation (5G) radio access technology or new radio (NR) access technology.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One example embodiment is directed to a method, which may include identifying at least one user equipment requiring dual connectivity or multi connectivity support, and configuring, by an anchor network node, at least one secondary network node to serve as a duplication set for the at least one user equipment. The duplication set includes one or more secondary network nodes that are capable of transmission of a duplicated packet to the at least one user equipment. The method may also include receiving, from the at least one secondary network node, estimates of supported latency and reliability for the at least one user equipment. The configuring may include selecting the duplication set that minimizes a probability of outage and minimizes latency of the transmission of the duplicated packet to the at least one user equipment.

Another example embodiment is directed to an apparatus, which may include at least one processor and at least one memory comprising computer program code. The at least one memory and computer program code configured, with the at least one processor, to cause the apparatus at least to identify at least one user equipment requiring dual connectivity or multi connectivity support, and configure at least one secondary network node to serve as a duplication set for the at least one user equipment. The duplication set includes one or more secondary network nodes that are capable of transmission of a duplicated packet to the at least one user equipment. The at least one memory and computer program code may be further configured, with the at least one processor, to cause the apparatus at least to receive, from the at least one secondary network node, estimates of supported latency and reliability for the at least one user equipment. The configuring may include selecting the duplication set that minimizes a probability of outage and minimizes latency of the transmission of the duplicated packet to the at least one user equipment.

Another example embodiment is directed to an apparatus that may include identifying means for identifying at least one user equipment requiring dual connectivity or multi connectivity support, and configuring means for configuring at least one secondary network node to serve as a duplication set for the at least one user equipment. The duplication set includes one or more secondary network nodes that are capable of transmission of a duplicated packet to the at least one user equipment. The apparatus may also include receiving means for receiving, from the at least one secondary network node, estimates of supported latency and reliability for the at least one user equipment. The configuring means may include means for selecting the duplication set that minimizes a probability of outage and minimizes latency of the transmission of the duplicated packet to the at least one user equipment.

Another example embodiment is directed to a non-transitory computer readable medium comprising program instructions stored thereon for performing at least the following the steps: identifying at least one user equipment requiring dual connectivity or multi connectivity support, and configuring at least one secondary network node to serve as a duplication set for the at least one user equipment. The duplication set includes one or more secondary network nodes that are capable of transmission of a duplicated packet to the at least one user equipment. The steps may also include receiving, from the at least one secondary network node, estimates of supported latency and reliability for the at least one user equipment. The configuring may include selecting the duplication set that minimizes a probability of outage and minimizes latency of the transmission of the duplicated packet to the at least one user equipment.

Another example embodiment is directed to a method, which may include receiving, by a secondary network node, quality reports for a user equipment. The method may then include, based on at least one of the received quality reports and load conditions, estimating supported latency and reliability for the user equipment, and transmitting the estimated supported latency and reliability to an anchor network node.

Another example embodiment is directed to an apparatus, which may include at least one processor and at least one memory comprising computer program code. The at least one memory and computer program code configured, with the at least one processor, to cause the apparatus at least to receive quality reports for a user equipment, to estimate supported latency and reliability for the user equipment based on at least one of the received quality reports and load conditions, and to transmit the estimated supported latency and reliability to an anchor network node.

Another example embodiment is directed to an apparatus, which may include receiving means for receiving quality reports for a user equipment, estimating means for estimating supported latency and reliability for the user equipment, based on at least one of the received quality reports and load conditions, and transmitting means for transmitting the estimated supported latency and reliability to an anchor network node.

Another example embodiment is directed to a non-transitory computer readable medium comprising program instructions stored thereon for performing at least the following: receiving quality reports for a user equipment, estimating supported latency and reliability for the user equipment based on at least one of the received quality reports and load conditions, and transmitting the estimated supported latency and reliability to an anchor network node.

BRIEF DESCRIPTION OF THE DRAWINGS

For proper understanding of example embodiments, reference should be made to the accompanying drawings, wherein:

FIG. 7a illustrates an example block diagram of an apparatus, according to one example embodiment;

FIG. 7b illustrates an example block diagram of an apparatus, according to another example embodiment; and FIG. 7c illustrates an example block diagram of an apparatus, according to another example embodiment.

DETAILED DESCRIPTION

Figure 1:
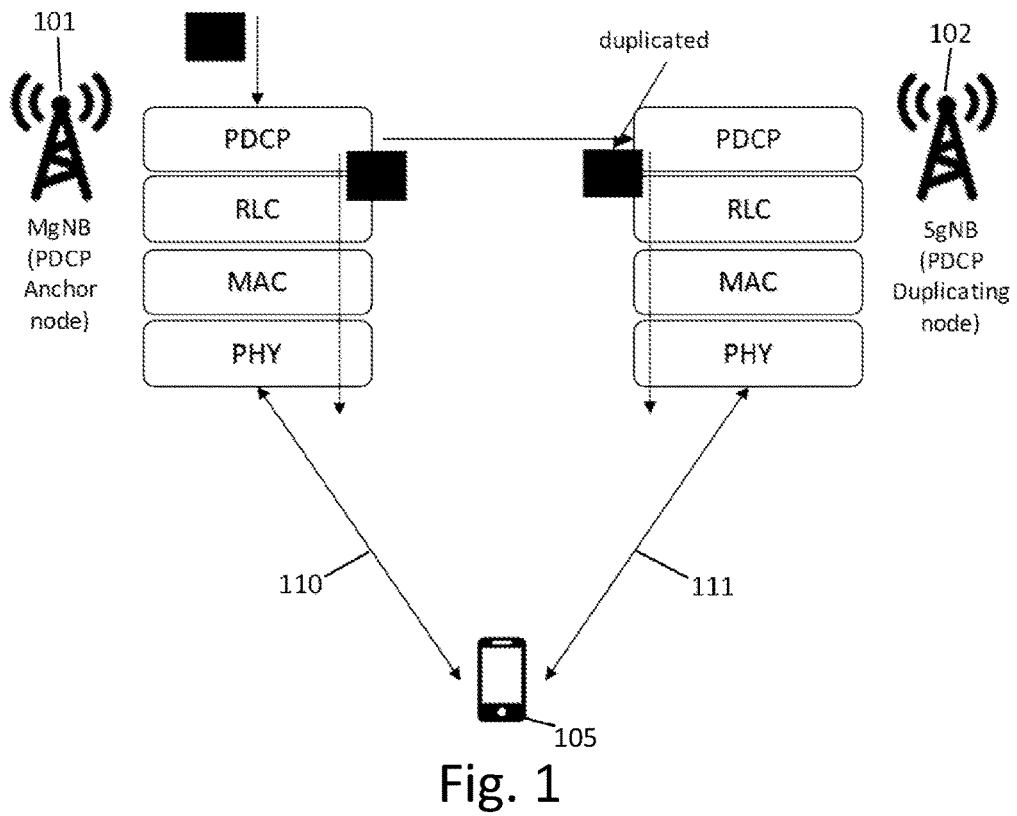
FIG. 1 illustrates an example system diagram schematically depicting NR DC/MC operation with data duplication in the downlink direction, according to some example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for estimating the reliability and/or latency of a transmission in communication systems, such as LTE or NR, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Dual connectivity (DC), as standardized by 3GPP in LTE Releases 12 and 13, extends the LTE-Advanced carrier Aggregation (CA) functionality to allow a user equipment (UE) to simultaneously receive and/or send data from two different base stations or eNBs. So far, DC has been proposed as a solution to boost the throughput performance, using data split at the packet data convergence protocol (PDCP) layer.

For a UE configured with LTE Carrier Aggregation (CA) for a certain master eNB (MeNB) and secondary eNB (SeNB) semi-statically via radio resource control (RRC), activation and deactivation of the configured secondary cell (SCell activation and deactivation) can occur on a fast basis (i.e., via medium access control (MAC) control element). The procedure allows for limiting the UE battery consumption, while still being able to activate or deactivate a component carrier (CC) quickly if traffic/load/signal quality demands require to do so.

NR DC/multi-connectivity (MC) can be considered as being built on top of LTE DC. In DC, a UE is connected to one MeNB and one SeNB. A Master Cell Group (MCG) is a group of serving cells associated with the MeNB, comprised of the Primary Cell (PCell) and optionally one or more Secondary Cell(s) (SCells). A Secondary Cell Group (SCG) is a group of serving cells associated with the SeNB, comprised of Primary SCell (PSCell) and optionally one or more Scells. At least one cell in the SCG has a configured uplink (UL) component carrier (CC) and one of them, named PSCell, is configured with Physical Uplink Common Control Channel (PUCCH) resources. When SCG is configured, there is at least one SCG bearer or one split bearer. PSCell cannot be de-activated so it is always active.

In 5G NR standardization activities, DC and MC are being proposed as a potential solution for Ultra Reliable Low Latency Communication (URLLC) application with an objective of boosting data robustness and reliability by means of data duplication across the different nodes. In fact, it has been agreed in 3GPP to support PDCP packet duplication for the NR to improve reliability. Certain example embodiments described herein aim to improve the operation of DC/MC downlink (DL), for example, for URLLC and High Reliability Low Latency (HRLC) applications in 5G NR (i.e., NR DC), as well as in NR-LTE DC (i.e., EN-DC, NE-DC). Also in the context of NR CA/DC, the concept of bandwidth Part (BWP) is introduced. From a UE perspective, BWP(s) may be similar to CCs.

The success of DC in boosting network reliability and/or improving latency may depend on the appropriate selection of the SeNB that offers the best reliability and latency performance to the serving user. However, selection of such a SeNB offering the best reliability and latency performance may not be straightforward to determine as it can depend on a number of factors including, for example, the respective user's signal strength, interference scenarios, and the load conditions at the candidate SeNBs. In one example embodiment, at least these problems may be addressed by providing a solution that optimizes the configuration/activation of DC/MC PDCP data duplication. For example, an embodiment may introduce new mechanisms to signal the estimated latency and reliability of a potential secondary node connection to a master gNodeB (gNB).

FIG. 1 illustrates an example system diagram schematically depicting NR DC/MC operation with data duplication in the downlink direction, according to some example embodiments. For the sake of simplicity, in the following, the DC case is addressed; however, example embodiments are also applicable to the MC case, or any other approach allowing for simultaneous transmission or reception from multiple base stations.

In the example of FIG. 1, the gNB towards which the traffic is terminated from the core network and which is in control of the PDCP duplication is called the PDCP anchor node, which is depicted as MgNB 101 in FIG. 1. Any other gNB serving the duplicated PDCP packets for a given UE 105 is termed as the PDCP duplicating node, which is depicted as secondary gNB (SgNB) 102 in the example of FIG. 1. When a packet arrives at the PDCP-MgNB 101, it may be duplicated at the PDCP layer and, if so, the duplicated packet is forwarded to one or more PDCP duplicating gNB node(s) 102, for example, over the Xn network interface(s) between gNBs. The same data packet (i.e., PDCP packet data unit (PDU) with a particular sequence number, SN) may then be independently transmitted to the same UE 105 through multiple links 110, 111 (the MgNB link and the duplicating gNBs). In certain example embodiments, as used herein, the term 'duplication set' may denote the set of gNBs (i.e., the MgNB and the duplicating gNB(s)) that can transmit a duplicated packet.

For URLLC applications, DC introduces an additional diversity order. This implies that, for a duplicated packet to fail within a given latency target, it needs to fail from all the duplicated links.

As a numerical example, a reliability-oriented DC case through two nodes may be considered. The outage probability through the two nodes for a given latency target may be denoted as $r_1$ and $r_2$, respectively. The resulting outage probability of the duplicated packet with DC is then $r_1 r_2$. Hence, the performance gains observed with DC may depend strongly on the selection of an appropriate SgNB offering a low outage probability and/or high reliability. However, as mentioned above, the reliability for a given UE through a particular gNB depends on a number of factors such as the signal quality, experienced interference, load, etc., and is not easily known at the MgNB.

Therefore, to maximize the reliability and/or minimize the latency of duplicated transmissions with DC, methods to estimate the reliability and/or the latency of a transmission through a potential SgNB are to be introduced, according to certain example embodiments.

It should be noted that, while FIG. 1 illustrates signaling between nodes labeled as a gNB and UE, the gNB may also be an access point, base station, node B, eNB, or any other network node capable of providing radio access functionality, and the UE may be a mobile device, stationary device, IoT device, or any other device capable of communication with a wireless or wired communication network.

Some example embodiments provide a method for a MgNB to select and activate, on a fast basis, the most appropriate duplication set for any given UE, which allows minimizing the actual outage probability and/or latency. To guide the selection of the duplication set, one example embodiment enables the estimating, and exchanging towards the MgNB, the achievable reliability and/or latency performance of a transmission to a UE through a duplicating or SgNB. The transmission of a packet or a sequence of packets and their copies may then occur from activated gNBs of the duplication set.

Figure 2:
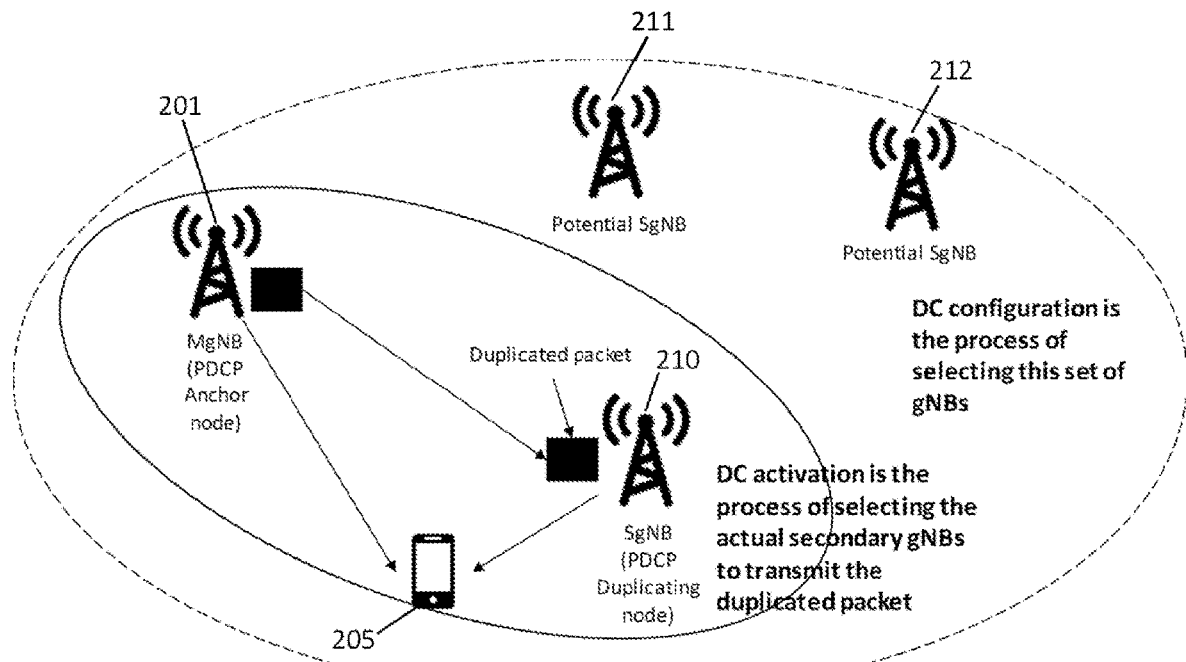
FIG. 2 illustrates an example system diagram depicting the configuration and/or activation, according to some example embodiments.

In one example embodiment, the selection of SgNB(s) for packet duplication transmission may be divided into a configuration step and an activation step. FIG. 2 illustrates an example system diagram depicting the configuration and activation, according to some example embodiments. Configuration may refer to the identification and configuration of the set of candidate SgNB(s) that will form the actual transmission duplication set, and activation may refer to the dynamic process of selecting the configured SgNB(s) from within the duplication set for the actual PDCP packet duplication transmission. In the example of FIG. 2, the duplication set includes SgNB 210, SgNB 211, and SgNB 212, while the selected or activated SgNB for transmission of the duplicated packet to UE 205 is SgNB 210. In one example, the configuration and activation may be performed or initiated by the anchor node, MgNB 201. Activation may occur over a short time frame, and may be decided on a per PDCP packet granularity. On the other hand, configuration may occur over a much longer time period and may be based on long-term channel statistics.

Figure 3A:
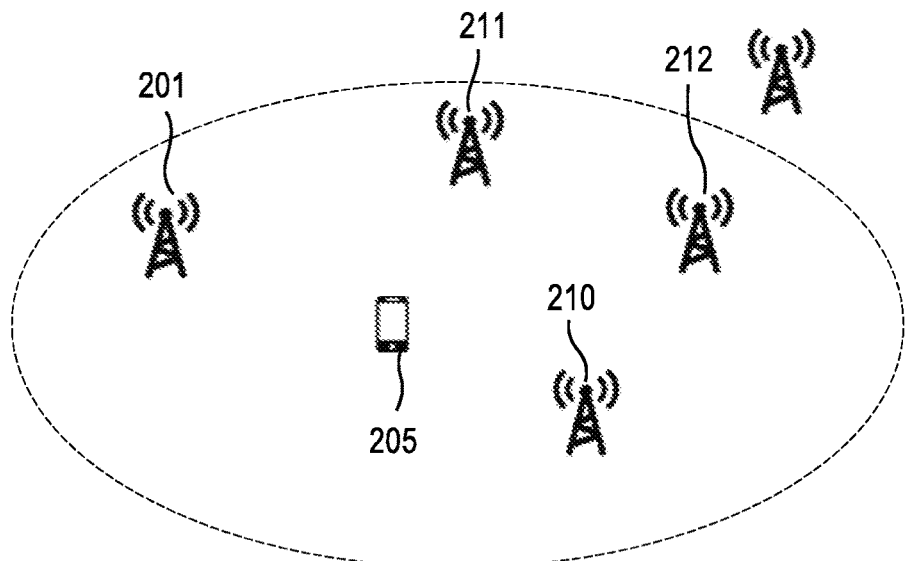
FIG. 3a illustrates an example system diagram depicting the identification of UE(s) that may need DC/MC support, and selection of a configuration set for that UE, according to an example embodiment.

In an example embodiment, UEs with URLLC traffic, which may need performance enhancement via DC or MC, may be identified. For example, this may include UEs with URLLC traffic that are at the cell edge and/or have a large path loss to the serving base station. FIG. 3a illustrates an example system diagram depicting the identification of UE(s) that may need DC/MC support, and selection of a configuration set for that UE, according to an example embodiment. The DC configuration set may refer to the set of candidate SgNBs that can potentially form the duplication set. A non-limiting example of the DC configuration set selection criteria can be the set of gNBs/cells based UE RRM measurement events Ax, based on RSRP or RSRQ. In the example of FIG. 3a, anchor node 201 may identify the UE 205 as being a UE that will need DC/MC support. The anchor node 201 may then select the configuration set for UE 205, which in this example includes SgNB 210, SgNB 211, and SgNB 212.

According to one example embodiment, the MgNB 201 may configure the UE 205 to send periodic and/or aperiodic reports expressing the (downlink) quality of the links comprising the MgNB 201 and any of the configured SgNBs 210, 211, 212. For example, the reports may include channel quality indicator(s) (CQIs) or channel state information (CSI) reports. In certain example embodiments, the report(s) received from the UE 205 may be made available to the configured SgNBs 210, 211, 212. In an example embodiment, for cases where the UE 205 has sent the report(s) only to the MgNB 201 (e.g., if the UE 205 only has uplink transmission to the MgNB 201), the MgNB 201 may signal the corresponding report(s), for instance via the Xn interface, to the configured SgNBs 210, 211, 212.

Figure 3B:
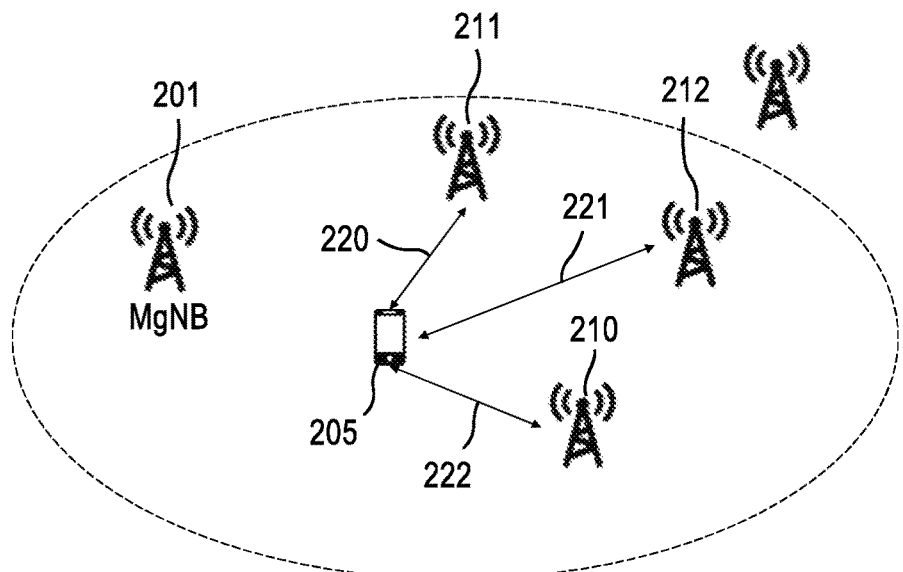
FIG. 3b illustrates an example system diagram depicting the configuring of the UE to send quality reports, and the sending of the reports to gNBs in the configuration set, according to an example embodiment.

In another example embodiment, the MgNB 201 may configure the UE 205 to send quality reports including, for example CQIs, to all the gNBs 210, 211, 212 in the DC configuration set periodically. The granularity of CQI feedback can be implementation and/or scenario specific. FIG. 3b illustrates an example system diagram depicting the configuring of the UE to send the quality reports, and the sending of the reports to gNBs in the configuration set, according to an example embodiment. In the example of FIG. 3b, the UE 205 may be configured to send periodic CQI directly to the gNBs 210, 211, 212 that are in the configuration set, for example, over links 220, 221, 222. In another example embodiment, UE(s), such as UE 205, may be configured to send aperiodic CQI reports.

In certain example embodiments, the MgNB 201 may request the configured SgNBs 210, 211, 212 to report estimates of supported latency and reliability for a certain UE, such as UE 205. According to one example, the latency and reliability estimate for the UE 205 at each of the configured gNBs 210, 211, 212 may be fed back to the MgNB 201 over the Xn interface. According to some example embodiments, the feedback of the latency and reliability estimates may be an event based on a one-time request, or a periodic configuration where the configured gNBs 210, 211, 212 are asked to periodically report latency and reliability estimates for a certain UE, or set of UEs, back to the MgNB 201. It is noted that, in certain example embodiments, the SgNBs 210, 211, 212 are able to estimate the achievable packet latency and/or reliability for a UE, given a SgNB's detailed local knowledge of the instantaneous load conditions, as well as the UE's radio conditions.

In another example embodiment, the SgNBs 210, 211, 212 may provide additional information as part of their latency and reliability estimates. For example, the configured SgNBs 210, 211, 212 may utilize available 5G QoS indicator (5QI) parameter information for the URLLC traffic of UEs. The 5QI parameters may include information such as expected packet size, reliability target, and latency constraints. Hence, based on the 5QI parameters, the SgNBs 210, 211, 212 may feed back a boolean value (e.g., ACK/NACK), expressing whether the 5QI requirement can be fulfilled by the respective SgNB.

Figure 3C:
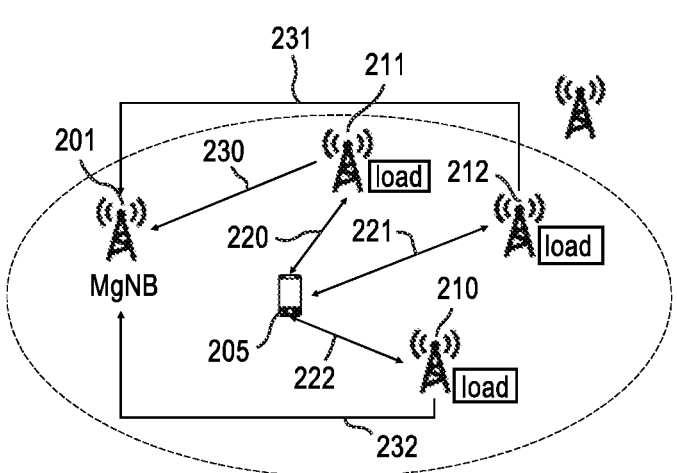
FIG. 3c illustrates an example system diagram depicting the generating and sharing of a latency/reliability matrix and preference indicator, according to an example embodiment.

FIG. 3c illustrates an example system diagram depicting the generating and sharing of a latency/reliability matrix and preference indicator, according to an example embodiment. As illustrated in the example of FIG. 3c, based on the CQI feedback and the gNB's load conditions, one or more of the gNBs 210, 211, 212 may estimate the reliability and latency for the configured UE 205. This estimate is not necessarily limited to a single latency target. Hence, the gNB(s) 210, 211, 212 may estimate the supportable reliability for a set of latency targets, for example latencies of [1, 5, 10, 20] ms, to thereby create a latency/reliability matrix. In addition, the SgNB(s) 210, 211, 212 may also generate a number with a value between 0 and 1 (from lowest to highest), indicating its preference in serving this UE/bearer, for example, based on the local optimization policies and the estimated load situation. In an example embodiment, the estimated latency/reliability matrix and preference indicator may be provided to the MgNB 201 via communication links 230, 231, 232, for example. This will help the MgNB 201 select the appropriate SgNB when more than one candidate SgNBs can fulfill the reliability and latency target. Such a preference value will, among other things, provide an indication of the candidate SgNBs' load. For a particular SgNB with more than one configured UE, such latency/reliability matrix estimate and preference indicator may be generated for each UE independently.

In some example embodiments, the estimated latency/reliability matrix and preference indicator can either be pushed to the MgNB 201 periodically, or pulled by the MgNB 201 as and when required, for instance, through the Xn interface. Providing the information periodically does not incur any additional delay as the information will be readily available at the MgNB, whereas pulling the information as needed may avoid unnecessary signaling. The decision to either pull or push the information may depend on the targeted reliability/latency figures, Xn load conditions, among others.

Given the detailed knowledge of the achievable packet latency and/or reliability at the different SgNBs 210, 211, 212, the MgNB 201 can make intelligent decisions on which of the SgNBs should be used for PDCP packet duplication. In an example embodiment, the decision may be implemented in the form of new procedures for fast activation/deactivation of the configured SgNBs 210, 211, 212 (i.e., assuming a two-step procedure as for CA—first configuration, and then activation). Alternatively, the decision on which of the SgNB(s) should be selected for packet duplication may be implemented as part of the PDCP-layer flow control procedure in the MgNB 201, deciding for each packet which SgNB(s) duplicated packets are sent to.

Figure 3D:
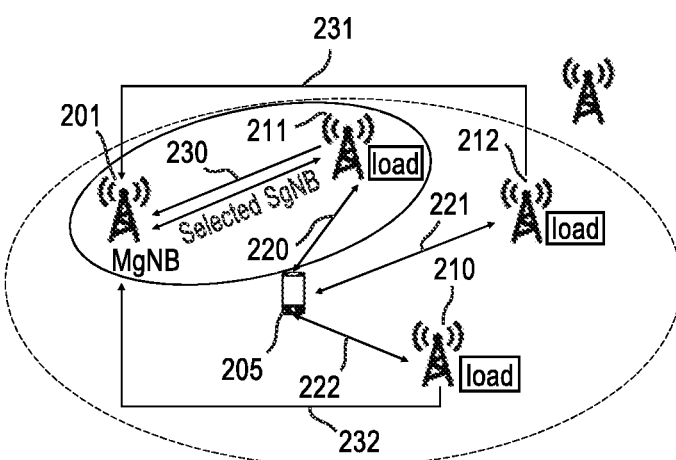
FIG. 3d illustrates an example system diagram depicting the selecting of the SgNB with the best latency and/or reliability figures for packet duplication, according to an example embodiment.

FIG. 3d illustrates an example system diagram depicting the selecting of the SgNB with the best latency and/or reliability figures for packet duplication, according to an example embodiment. According to an example embodiment, when the MgNB 201 seeks to duplicate a packet to the UE 205, the MgNB 201 selects the optimal SgNB for packet duplication, which may be the SgNB that estimates it will have the lowest latency and highest reliability. In the example of FIG. 3d, the MgNB 201 has selected SgNB 211 to perform the packet duplication.

In yet another example embodiment, the feedback of latency and/or reliability estimates from the SgNBs 210, 211, 212 may be used as a supplementary triggering of a change of the MgNB, in addition to the traditional reference signal received power (RSRP)/reference signal received quality (RSRQ) UE Reporting Ax events. For example, if one or more of the SgNBs 210, 211, 212 repeatedly report superior latency or reliability estimates than what is supported by the currently configured MgNB 201, the network may decide to reconfigure one of the currently configured SgNB(s) to become the MgNB. In an example embodiment, the triggering of a change of MgNB may take into account RSRP/RSRQ UE radio resource management (RRM) events, and the cost of an MgNB change that, for example, may require change of PDCP security keys, etc.

Figure 4:
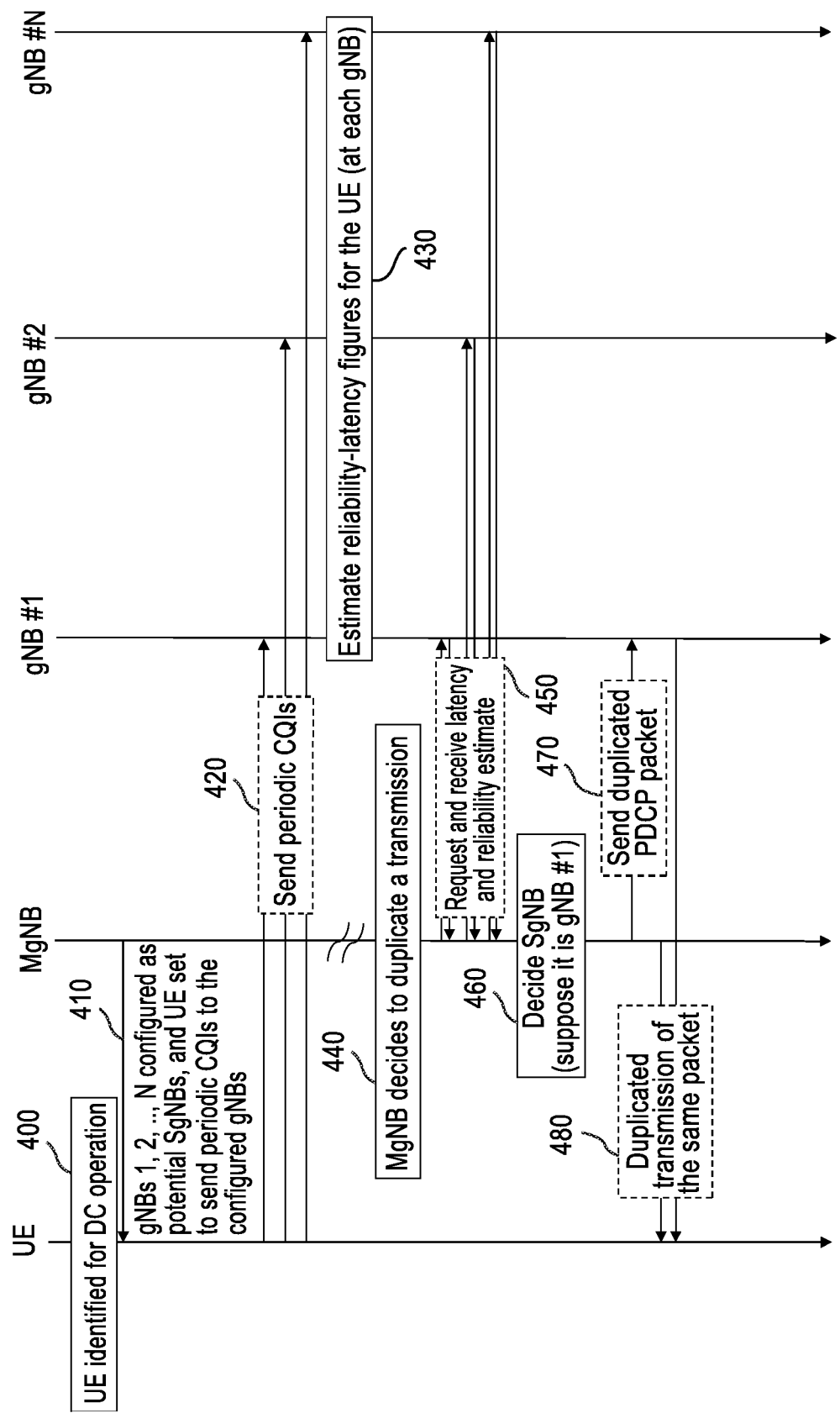
FIG. 4 illustrates an example signaling diagram, according to one example embodiment.
Figure 5:
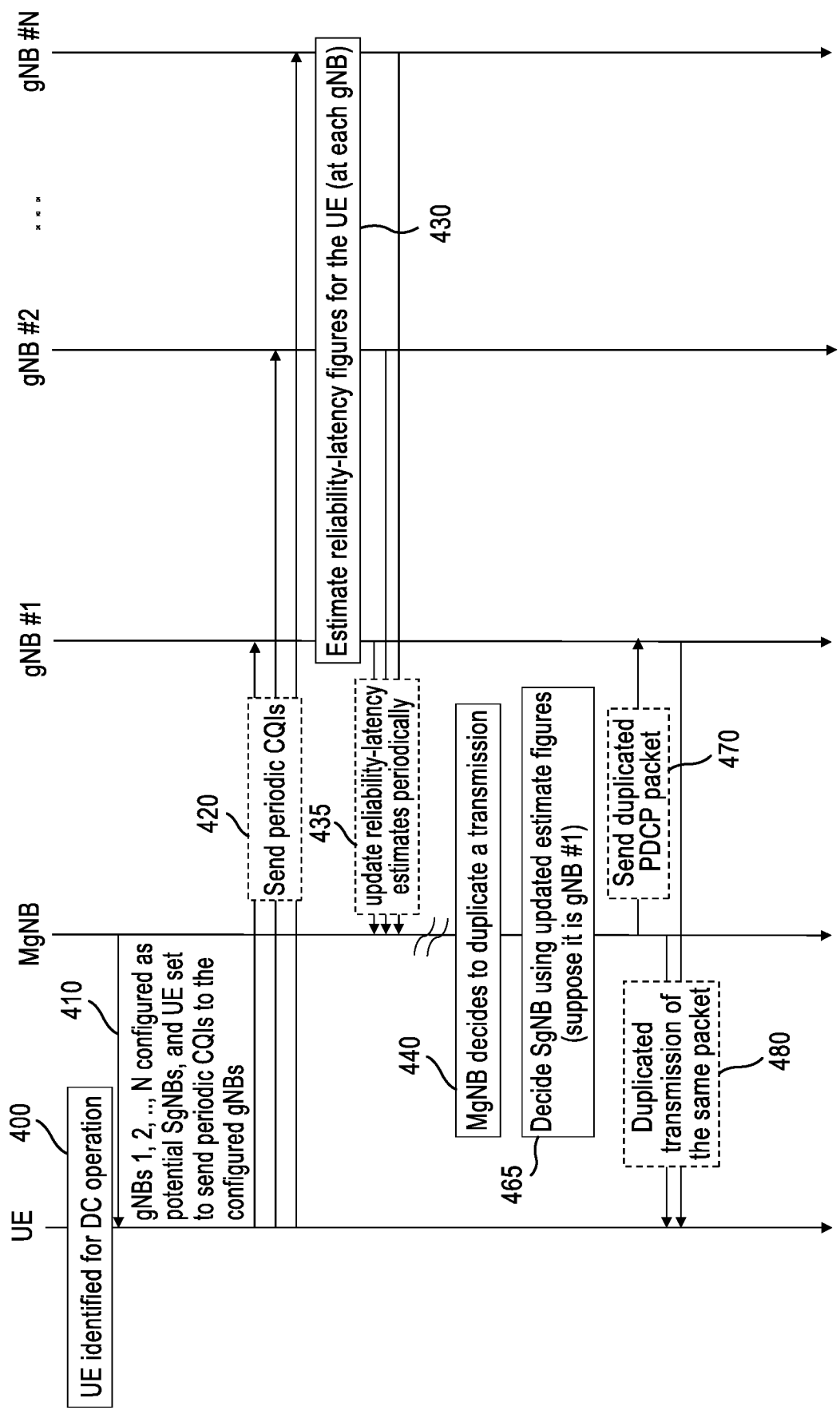
FIG. 5 illustrates an example signaling diagram, according to another example embodiment.

FIGS. 4 and 5 illustrate example message signaling diagrams, according to example embodiments. FIG. 4 depicts the example message flow for the pull option, in which the anchor MgNB pulls the latency/reliability estimate figures from candidate SgNBs as and when required. Meanwhile, FIG. 5 depicts the example message flow for the push option, in which the candidate SgNBs periodically update the latency/reliability estimate figures to the anchor MgNB.

As illustrated in the examples of FIGS. 4 and 5, at 400, a UE is identified for DC/MC operation. At 410, one or more gNB(s) are configured as potential SgNB(s) for packet duplication (i.e., the duplication set is determined), and the UE is configured to send periodic and/or aperiodic quality reports (e.g., CQIs) to the configured SgNB(s). The UE may transmit, at 420, the quality reports to the configured SgNB(s). Each of the configured SgNB(s) may then, at 430, estimate reliability/latency figures for the UE.

In the pull option example of FIG. 4, the message flow may next include, at 440, the anchor MgNB deciding to duplicate a transmission and, at 450, the anchor MgNB requesting and receiving latency and reliability estimates from the configured SgNB(s). At 460, the anchor MgNB may select which of the SgNB(s) to use for duplicated transmission based on the requested and received latency and reliability estimates.

In the push option example of FIG. 5, the message flow includes, at 435, receiving updated latency and reliability estimates periodically from the configured SgNB(s). The anchor MgNB may then decide, at 440, to duplicate a transmission and, at 465, selects which of the SgNB(s) to use for duplicated transmission based on the updated latency and reliability estimates. In an example embodiment, the anchor MgNB may select the SgNB with the lowest latency and/or highest reliability estimates to perform the duplicated transmission.

The anchor MgNB may then transmit, at 470, the duplicated packet to the selected SgNB. Then, at 480, the selected SgNB and anchor MgNB may duplicate transmission of the same packet to the UE.

Figure 6A:
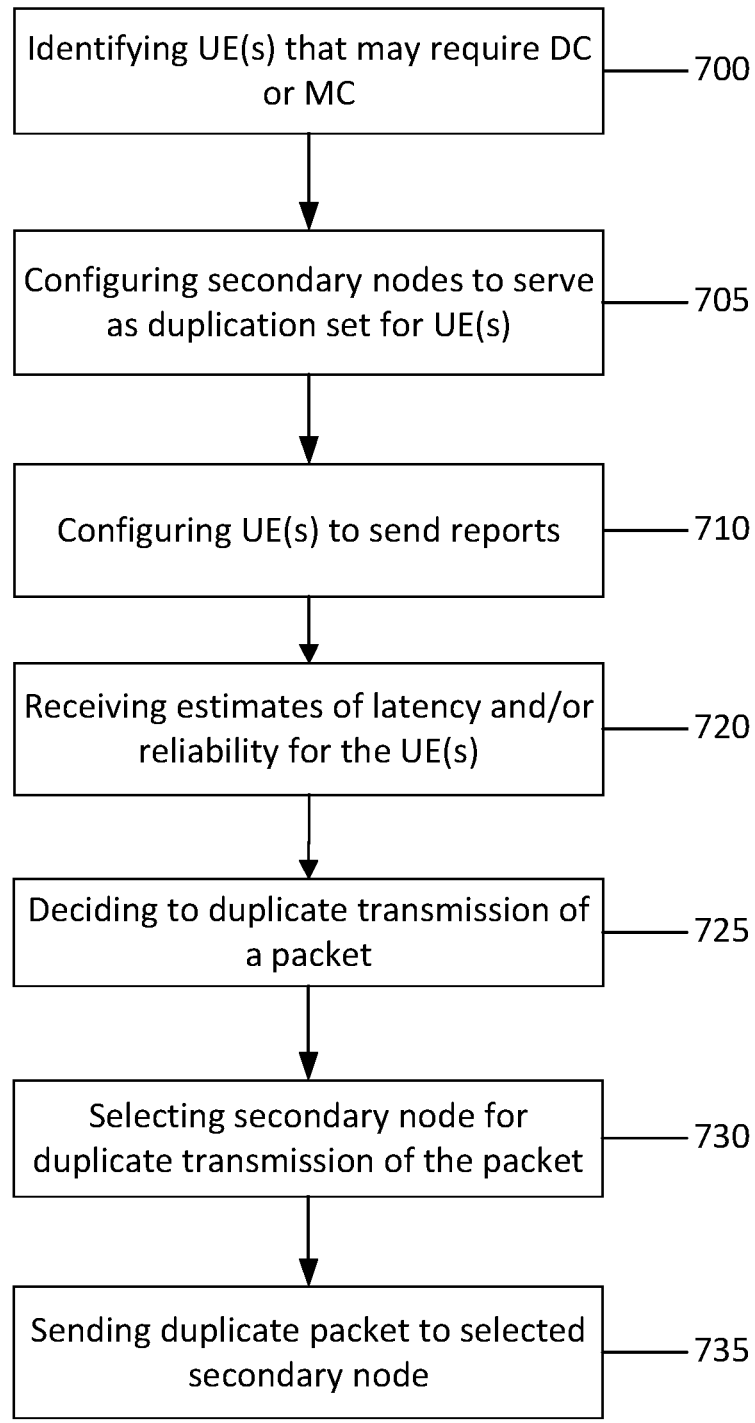
FIG. 6a illustrates an example flow diagram of a method, according to one example embodiment.

FIG. 6a illustrates an example flow diagram of a method for configuring, activating, and/or selecting one or more duplicating (secondary) network nodes (e.g., SgNB(s)) for a given UE, while minimizing an actual outage probability and/or minimizing latency, according to one example embodiment. In certain example embodiments, the flow diagram of FIG. 6a may be performed by a network node, such as a base station, node B, eNB, gNB, or any other access node. More specifically, in one example embodiment, the method of FIG. 6a may be performed by an anchor network node, such as a MgNB. As illustrated in the example of FIG. 6a, the method may include, at 700, identifying one or more UE(s) that may require DC or MC support. As an example, the UE(s) that may require DC or MC support may include UEs with URLLC traffic that are at the cell edge and/or have a large path loss to the anchor network node. According to an example embodiment, the method may include, at 705, configuring one or more secondary network node(s) (e.g., SgNB(s)) to serve as a duplication set for the UE(s). In one example, the duplication set includes one or more secondary network nodes that are capable of transmission of a duplicated packet to the UE(s). According to certain example embodiments, the configuring 705 may include selecting the duplication set that minimizes a probability of outage and/or minimizes latency of the downlink transmission towards the UE(s), such as the transmission of a duplicated packet to the UE(s).

According to an example embodiment, the method may also include, at 710, configuring the UE(s) to send periodic and/or aperiodic quality reports indicating the quality of the links between the UE(s) and the secondary network node(s) and between the UE(s) and the anchor network node. As one example, the quality reports may include CQI and/or CSI reports.

In certain example embodiments, the method may include receiving the quality reports from the UE(s), and, optionally providing the reports to the secondary network node(s), for example over the Xn interface, in case the UE(s) did not also directly send the reports to the secondary network node(s). In one example embodiment, the method may optionally include requesting, from the secondary network node(s), estimates of their supported latency and reliability for the UE(s). In some example embodiments, the method may include, at 720, receiving in response to the request or periodically receiving (without sending the request), from the secondary network node(s), the estimates of supported latency and/or reliability for the UE(s). According to certain example embodiments, the secondary network node(s) may be able to estimate the achievable packet latency and/or reliability for the UE(s), for example, given the secondary network node's detailed local knowledge of the instantaneous load conditions and/or the UE(s) radio conditions (e.g., as received in the quality reports from the UE).

According to an example embodiment, either before or after receiving the estimates, the method may include, at 725, deciding to duplicate transmission of a packet to the UE(s). In one example embodiment, the method may include, at 730, selecting one of the secondary network node(s) to transmit the duplicated packet based on the estimates of the supported latency and reliability. The method may then include, at 735, transmitting the duplicated packet to the selected secondary network node for duplicate transmission to the UE(s). According to an example embodiment, the selecting 730 may include selecting the secondary network node, for the duplicated packet transmission, that is estimated to provide the lowest latency and highest reliability. In one example embodiment, the selecting 730 may include selecting the secondary network node, for the duplicated packet transmission, on a per packet basis (e.g., deciding for each packet which secondary network node a duplicated packet is sent to).

In further example embodiments, the method may also include utilizing the estimates of supported latency and/or reliability to decide whether to trigger a change of anchor network node. For example, in an embodiment, if the secondary network node(s) repeatedly report superior latency and/or reliability estimates than what is supported by the currently configured anchor network node, the network may decide to reconfigure one of the currently configured secondary network node(s) to become the anchor network node.

Figure 6B:
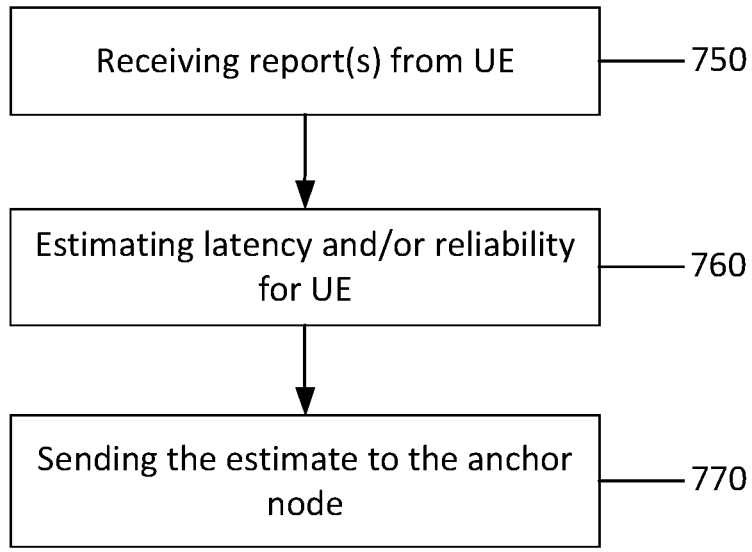
FIG. 6b illustrates an example flow diagram of a method, according to another example embodiment.

FIG. 6b illustrates an example flow diagram of a method for exchanging of latency and/or reliability estimate information with an anchor network node, according to one example embodiment. In example certain embodiments, the flow diagram of FIG. 6b may be performed by a network node, such as a base station, node B, eNB, gNB, or any other access node. For instance, in one example embodiment, the method of FIG. 6b may be performed by a secondary network node, such as a SgNB that is configured as a member of a duplication set by an anchor network node. As illustrated in the example of FIG. 6b, the method may include, at 750, receiving periodic and/or aperiodic quality reports for a UE. For example, the quality reports may include CQI and/or CSI reports. In certain example embodiments, the receiving 750 may include receiving the quality reports from the anchor network node or directly from the UE. In an example embodiment, based on the received quality reports and/or load conditions, the method may include, at 760, estimating the supported latency and/or reliability that the secondary network node can achieve for the UE. The method may then include, at 770, transmitting the estimated supported latency and/or reliability to the anchor network node.

In one example embodiment, the estimating 760 and/or transmitting 770 may be performed in response to a request received from the anchor network node. In another example embodiment, the transmitting 770 may include periodically sending, to the anchor network node, estimates of the supported latency and reliability for the UE(s), without first receiving a request for the estimates. According to certain example embodiments, the estimating 760 may include the secondary network node estimating its achievable packet latency and/or reliability for the UE(s), for example, based on its detailed local knowledge of the instantaneous load conditions and/or the UE(s) radio conditions (e.g., as received in the quality reports from the UE). In an example embodiment, the transmitting 770 may include transmitting the estimates over the Xn interface.

According to certain example embodiments, the estimates of supported latency and reliability may include one or more of: an estimate of supportable reliability for a set of latency target values to create a latency/reliability matrix, a numerical value indicating the preference of the secondary network node in serving the UE(s) that may be based at least on a load at the secondary network node, and/or a Boolean value indicating whether secondary network node can fulfill a required quality of service for the UE(s). For instance, in an example embodiment, the estimating 760 may include utilizing available 5QI parameter information for the URLLC traffic of the UE(s), such as expected packet size, reliability target, and latency constraints. Thus, based on the 5QI parameters, the transmitting 770 may include feeding back a Boolean variable (e.g., ACK/NACK) indicating whether the 5QI requirement can be fulfilled by the secondary network node.

According to one example embodiment, for instance when the secondary network node provides an estimate that it can provide the lowest latency and/or highest reliability from among the network nodes in the duplicate set, the method may include receiving a duplicate packet from the anchor network node, and then transmitting the duplicate packet to the UE.

Figure 6C:
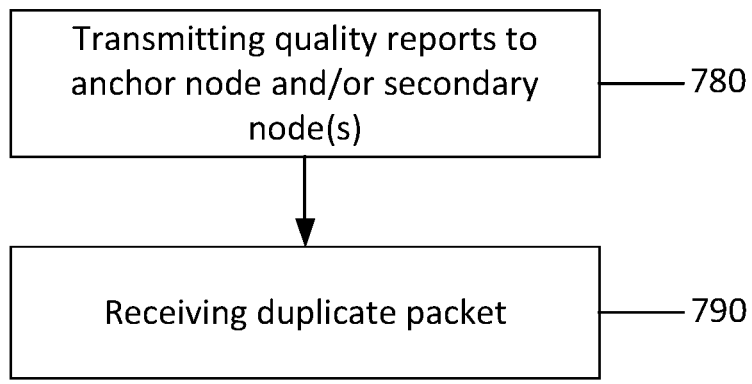
FIG. 6c illustrates an example flow diagram of a method, according to another example embodiment

FIG. 6c illustrates an example flow diagram of a method, according to another example embodiment. In certain example embodiments, the flow diagram of FIG. 6c may be performed, for example, by a UE, mobile station, mobile equipment, IoT device, or the like. As an example, the method may be performed by a UE or device that is configured for DC and/or MC operation. As illustrated in the example of FIG. 6c, the method may include, at 780, transmitting periodic and/or aperiodic quality reports to an anchor network node and/or secondary network node(s). For example, the quality reports may include CQI and/or CSI reports for the UE. In an example embodiment, based on the quality reports and/or load conditions, the secondary network nodes may estimate the supported latency and/or reliability that the secondary network nodes can provide for the UE. According to one example embodiment, the method may also include, at 780, receiving a packet, such as a PDCP packet, from an anchor node, and also receiving a duplicate of the packet from a secondary network node. For example, the receiving 780 may include receiving the duplicate packet from a secondary network node that estimates that it can provide the lowest latency and/or highest reliability from among network nodes in a duplicate set configured for the UE.

FIG. 7a illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. In an example, apparatus 10 may be an anchor node (e.g., anchor gNB) and/or master node (e.g., MgNB). According to example embodiments, apparatus 10 may be controlled by memory 14 and processor 12 to perform the functions associated with any of the example embodiments described herein, such as the system or signaling flow diagrams illustrated in FIGS. 2-6. For example, in certain embodiments, apparatus 10 may be controlled by memory 14 and processor 12 to perform one or more of the steps performed by the MgNB 201 illustrated in FIGS. 2-3 or MgNB depicted in FIGS. 4 and 5. In example embodiments, for instance, apparatus 10 may be configured to perform a process for configuring, activating, and/or selecting one or more duplicating (secondary) network nodes (e.g., SgNB(s)) for a given UE, while minimizing an actual outage probability and/or minimizing latency.

For instance, in some example embodiments, apparatus 10 may be controlled by memory 14 and processor 12 to identify one or more UE(s) that may require DC or MC support. As an example, the UE(s) that may require DC or MC support may include UEs with URLLC traffic that are at the cell edge and/or have a large path loss to the apparatus 10. According to an example embodiment, apparatus 10 may be controlled by memory 14 and processor 12 to configure one or more secondary network node(s) (e.g., SgNB(s)) to serve as a duplication set for the UE(s). In one example, the duplication set includes one or more secondary network nodes that are capable of transmission of a duplicated packet to the UE(s). According to certain example embodiments, apparatus 10 may be controlled by memory 14 and processor 12 to select the duplication set that minimizes a probability of outage and/or minimizes latency of the downlink transmission towards the UE(s), such as the transmission of a duplicated packet to the UE(s).

According to an example embodiment, apparatus 10 may also be controlled by memory 14 and processor 12 to configure the UE(s) to send periodic and/or aperiodic quality reports indicating the quality of the links between the UE(s) and the secondary network node(s) and between the UE(s) and the apparatus 10. As one example, the quality reports may include CQI and/or CSI reports.

In example embodiments, apparatus 10 may be controlled by memory 14 and processor 12 to receive the quality reports from the UE(s), and, to optionally provide the reports to the secondary network node(s), for example over the Xn interface, in case the UE(s) did not also directly send the reports to the secondary network node(s). In one example embodiment, apparatus 10 may be controlled by memory 14 and processor 12 to request, from the secondary network node(s), estimates of their supported latency and reliability for the UE(s), and to receive, from the secondary network node(s), the requested estimates of supported latency and reliability for the UE(s). In another example embodiment, apparatus 10 may be controlled by memory 14 and processor 12 to periodically receive, from the secondary network node(s), estimates of the supported latency and reliability for the UE(s), without first sending a request for the estimates.

According to example embodiments, the secondary network node(s) may be able to estimate the achievable packet latency and/or reliability for the UE(s), for example, given the secondary network node's detailed local knowledge of the instantaneous load conditions and/or the UE(s) radio conditions (e.g., as received in the quality reports from the UE). In an example embodiment, the estimates may be received by apparatus 10 over the Xn interface.

According to example embodiments, the estimates of the supported latency and reliability may include one or more of: an estimate of supportable reliability for a set of latency target values to create a latency/reliability matrix, a numerical value indicating the secondary network node's preference in serving the UE(s) that may be based at least on a load at the secondary network node, and/or a Boolean value indicating whether the secondary network node(s) can fulfill a required quality of service for the UE(s). For instance, in an example embodiment, the secondary network node(s) may utilize available 5QI parameter information for the URLLC traffic of the UE(s), such as expected packet size, reliability target, and latency constraints. Thus, based on the 5QI parameters the secondary network node(s) may feed back a Boolean variable (e.g., ACK/NACK) indicating whether the 5QI requirement can be fulfilled by the secondary network node.

In example embodiments, apparatus 10 may be controlled by memory 14 and processor 12 to decide to duplicate packet transmission, either before or after receiving the estimates of latency and/or reliability from the secondary network node(s). In one example embodiment, apparatus 10 may be controlled by memory 14 and processor 12 to use the estimates of the supported latency and reliability to select one of the secondary network node(s) to transmit the duplicated packet, and to transmit the duplicated packet to the selected secondary network node for duplicate transmission to the UE(s). According to an example embodiment, apparatus 10 may be controlled to select the secondary network node, for the duplicated packet transmission, that estimates that it can provide the lowest latency and highest reliability, from among the secondary network nodes in the duplication set. In one example embodiment, to select the secondary network node, for the duplicated packet transmission, on a per packet basis (e.g., deciding for each packet which secondary network node a duplicated packet is sent to). Therefore, in example embodiments, the estimated achievable reliability and/or latency performance of a downlink transmission towards the UE(s) through the duplicating secondary network node is used by apparatus 10 to intelligently select and/or activate the optimal secondary network node for duplicate packet transmission.

In further example embodiments, apparatus 10 may be controlled by memory 14 and processor 12 to also utilize the estimates of supported latency and/or reliability to decide whether to trigger a change of anchor network node. For example, in an embodiment, if the secondary network node(s) repeatedly report superior latency and/or reliability estimates than what is supported by the currently configured anchor network node, the network may decide to reconfigure one of the currently configured secondary network node(s) to become the anchor network node. Such a decision as whether to trigger a change in the anchor network node may take into account RSRP/RSRQ UE RRM events, as well as the cost of anchor network node change that may require change of PDCP security keys, etc.

FIG. 7b illustrates an example of an apparatus 20 according to another example embodiment. In example embodiments, apparatus 20 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a base station, access point, Node B, eNB, gNB, WLAN access point, MME, and/or subscription server or other server associated with a radio access network, such as a LTE network, 5G or NR. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIGS. 2-6. As an example, apparatus 20 may correspond to any of the SgNBs illustrated in FIGS. 2-5. In example embodiments, apparatus 20 may be configured for the exchange of latency and/or reliability estimate information with an anchor network node.

For example, according to example embodiments, apparatus 20 may be configured as a member of a duplication set by an anchor network node. According to an example embodiment, apparatus 20 may be controlled by memory 24 and processor 22 to receive periodic and/or aperiodic quality reports for a UE. For example, the quality reports may include CQI and/or CSI reports. In certain example embodiments, the quality reports may be received by apparatus 20 from the anchor network node or directly from the UE. In an example embodiment, based on the received quality reports and/or load conditions, apparatus 20 may be controlled by memory 24 and processor 22 to estimate the supported latency and/or reliability that apparatus 20 can provide for the UE, and to transmit the estimated supported latency and/or reliability to the anchor network node.

In one example embodiment, apparatus 20 may be controlled by memory 24 and processor 22 to provide the estimate of the supported latency and/or reliability in response to a request from the anchor network node. In another example, apparatus 20 may be controlled by memory 24 and processor 22 to periodically send, to the anchor network node, estimates of the supported latency and reliability for the UE(s), without first receiving a request for the estimates. According to example embodiments, apparatus 20 may be controlled by memory 24 and processor 22 to estimate the achievable packet latency and/or reliability for the UE(s), for example, based on its detailed local knowledge of the instantaneous load conditions and/or the UE(s) radio conditions (e.g., as received in the quality reports from the UE). In an example embodiment, the estimates may be transmitted by apparatus 20 over the Xn interface.

According to example embodiments, apparatus 20 may be controlled by memory 24 and processor 22 to include, in the estimates of its supported latency and reliability, one or more of: an estimate of supportable reliability for a set of latency target values to create a latency/reliability matrix, a numerical value indicating the preference of apparatus 20 in serving the UE(s) that may be based at least on a load at the secondary network node, and/or a Boolean value indicating whether the apparatus 20 can fulfill a required quality of service for the UE(s). For instance, in an example embodiment, apparatus 20 may utilize available 5QI parameter information for the URLLC traffic of the UE(s), such as expected packet size, reliability target, and latency constraints. Thus, in an example, based on the 5QI parameters, apparatus 20 may be controlled by memory 24 and processor 22 to feed back a Boolean variable (e.g., ACK/NACK) indicating whether the 5QI requirement can be fulfilled by the apparatus 20.

According to one example embodiment, for instance when apparatus 20 provides an estimate that it can provide the lowest latency and/or highest reliability from among the network nodes in the duplicate set, apparatus 20 may be controlled by memory 24 and processor 22 to receive a duplicate packet from the anchor network node, and then to transmit the duplicate packet to the UE.

FIG. 7c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 7c.

As illustrated in the example of FIG. 7c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 7c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein, such as those illustrated in FIGS. 2-6. As an example, apparatus 30 may correspond to the UE illustrated in FIGS. 2-5. In some example embodiments, apparatus 30 may be configured for DC and/or MC operation.

According to some example embodiments, apparatus 30 may be controlled by memory 34 and processor 32 to transmit periodic and/or aperiodic quality reports to an anchor network node and/or secondary network node(s). For example, the quality reports may include CQI and/or CSI reports for apparatus 30. In an example embodiment, based on the quality reports and/or load conditions, the secondary network nodes may estimate the supported latency and/or reliability that the secondary network nodes can provide for the apparatus 30. According to one example embodiment, apparatus 30 may be controlled by memory 34 and processor 32 to receive a packet, such as a PDCP packet, from an anchor node, and also to receive a duplicate of the packet from a secondary network node. For example, the duplicate packet may be received from a secondary network node that estimates that it can provide the lowest latency and/or highest reliability from among network nodes in a duplicate set configured for the apparatus 30.

Therefore, certain example embodiments provide several technical improvements, enhancements, and/or advantages. Various example embodiments can, for example, enhance the performance of URLLC transmissions, optimize resource usage and reduce unnecessary transmissions by avoiding transmitting duplicated (PDCP) packets through SgNBs that cannot help meet the target reliability/latency. Additionally, certain example embodiments may avoid triggering undesirable packet transmissions from SgNBs that offers no benefits, which causes unnecessary interference.

Thus, example embodiments enhance performance of DC/MC by selecting a SgNB that offers the best reliability/latency, and reducing otherwise unnecessary transmissions which in turn reduces network interference. Consequently, certain example embodiments improve the reliability of URLLC transmissions, improve network load distribution by not selecting overloaded SgNBs, and also improve overall network energy efficiency. As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. A method, comprising:
   identifying at least one user equipment requiring dual connectivity or multi connectivity support;
   configuring, by an anchor network node, at least one secondary network node to serve as a duplication set for the at least one user equipment, the duplication set comprising one or more secondary network nodes that are capable of transmission of a duplicated packet to the at least one user equipment;
   receiving, from the at least one secondary network node, a latency/reliability matrix comprising estimates of supported latency and reliability for a set of latency target values of the at least one user equipment;
   wherein the configuring comprises selecting the duplication set that minimizes a probability of outage and minimizes latency of the transmission of the duplicated packet to the at least one user equipment, said method further comprising
   receiving reports from the at least one user equipment; and
   optionally providing the reports to the at least one secondary network node when the at least one user equipment has not sent the reports directly to the at least one secondary network node.

2. The method according to claim 1, further comprising:
   configuring the at least one user equipment to send periodic or aperiodic reports comprising an indication of a quality of links between the at least one user equipment and the at least one secondary network node and between the at least one user equipment and the anchor network node.

3. The method according to claim 2, wherein the reports comprise at least one of channel quality indicator(s) (CQIs) or channel state information (CSI) reports.

4. The method according to claim 1, further comprising:
transmitting, to the at least one secondary network node, a request for the estimates of supported latency and reliability for the at least one user equipment; and
wherein the receiving of the estimates of supported latency and reliability comprises receiving the estimates of supported latency and reliability in response to the request.

5. The method according to claim 4, further comprising:
using the estimates of the supported latency and reliability for selecting one of the at least one secondary network node to transmit a duplicated packet; and
transmitting the duplicated packet to the selected one of the at least one secondary network node for duplicate transmission to the at least one user equipment.

6. The method according to claim 5, wherein the selecting of one of the at least one secondary network node to transmit a duplicated packet comprises selecting the secondary network node estimated to provide the lowest latency and highest reliability.

7. The method according to claim 1, wherein:
wherein the receiving of the estimates of supported latency and reliability comprises periodically receiving, from the at least one secondary network node, the estimates of supported latency and reliability for the at least one user equipment.

8. The method according to claim 1, further comprising:
transmitting, to the at least one secondary network node, a request for the estimates of supported latency and reliability for the at least one user equipment,
wherein the receiving of the estimates of supported latency and reliability comprises receiving the estimates of supported latency and reliability in response to the request, and
wherein the estimates of the supported latency and reliability comprises at least one of:
a numerical value indicating a preference of the at least one secondary network node in serving the at least one user equipment, wherein the preference is based at least on a load at the at least one secondary network node; or
a Boolean value indicating whether the at least one secondary network node can fulfill a required quality of service for the at least one user equipment.

9. The method according to claim 1, further comprising:
transmitting, to the at least one secondary network node, a request for the estimates of supported latency and reliability for the at least one user equipment;
wherein the receiving of the estimates of supported latency and reliability comprises receiving the estimates of supported latency and reliability in response to the request, and
using the estimates of supported latency and reliability to decide whether to trigger a change of anchor network node.

10. A non-transitory computer readable medium comprising program instructions stored thereon which, when executed in hardware, cause the hardware to perform the method of claim 1.

11. An apparatus, comprising:
at least one processor; and
at least one memory comprising computer program code, the at least one memory and computer program code are configured, with the at least one processor, to cause the apparatus at least to:
identify at least one user equipment requiring dual connectivity or multi connectivity support;
configure at least one secondary network node to serve as a duplication set for the at least one user equipment, the duplication set comprising one or more secondary network nodes that are capable of transmission of a duplicated packet to the at least one user equipment;
receive, from the at least one secondary network node, a latency/reliability matrix comprising estimates of supported latency and reliability for a set of latency target values of the at least one user equipment;
configure the at least one user equipment to send periodic or aperiodic reports comprising an indication of a quality of links between the at least one user equipment and the at least one secondary network node and between the at least one user equipment and the apparatus;
receive the reports from the at least one user equipment; and
optionally provide the reports to the at least one secondary network node when the at least one user equipment has not sent the reports directly to the at least one secondary network node,
wherein the configuring comprises selecting the duplication set that minimizes a probability of outage and minimizes latency of the transmission of the duplicated packet to the at least one user equipment.

12. The apparatus according to claim 11, wherein the reports comprise at least one of channel quality indicator(s) (CQIs) or channel state information (CSI) reports.

13. The apparatus according to claim 11, wherein the at least one memory and computer program code are further configured, with the at least one processor, to cause the apparatus at least to:
transmit, to the at least one secondary network node, a request for the estimates of supported latency and reliability for the at least one user equipment; and
receive the estimates of supported latency and reliability in response to the request.

14. The apparatus according to claim 13, wherein the at least one memory and computer program code are further configured, with the at least one processor, to cause the apparatus at least to:
use the estimates of the supported latency and reliability to select one of the at least one secondary network node to transmit a duplicated packet; and
transmit the duplicated packet to the selected one of the at least one secondary network node for duplicate transmission to the at least one user equipment.

15. The apparatus according to claim 14, wherein the at least one memory and computer program code are further configured, with the at least one processor, to cause the apparatus at least to select the secondary network node estimated to provide the lowest latency and highest reliability to transmit the duplicated packet.

16. The apparatus according to claim 11, wherein the at least one memory and computer program code are further configured, with the at least one processor, to cause the apparatus at least to:
periodically receive, from the at least one secondary network node, the estimates of supported latency and reliability for the at least one user equipment.

17. An apparatus, comprising:
at least one processor; and
at least one memory comprising computer program code, the at least one memory and computer program code are configured, with the at least one processor, to cause the apparatus at least to:
identify at least one user equipment requiring dual connectivity or multi connectivity support;
configure at least one secondary network node to serve as a duplication set for the at least one user equipment, the duplication set comprising one or more secondary network nodes that are capable of transmission of a duplicated packet to the at least one user equipment;
receive, from the at least one secondary network node, a latency/reliability matrix comprising estimates of supported latency and reliability for a set of latency target values of the at least one user equipment;
transmit, to the at least one secondary network node, a request for the estimates of supported latency and reliability for the at least one user equipment; and
receive the estimates of supported latency and reliability in response to the request, and receive at least one of:
a numerical value indicating a preference of the at least one secondary network node in serving the at least one user equipment, wherein the preference is based at least on the load at the at least one secondary network node; or
a Boolean value indicating whether the at least one secondary network node can fulfill a required quality of service for the at least one user equipment.

18. The apparatus according to claim 17, wherein the at least one memory and computer program code are further configured, with the at least one processor, to cause the apparatus at least to:
use the estimates of supported latency and reliability to decide whether to trigger a change of anchor network node.

* * * * *